United States Patent [19]
Lehmacher et al.

[11] 3,857,329
[45] Dec. 31, 1974

[54] FABRICATION OF A CARRYING BAG FROM THERMOPLASTIC SYNTHETIC FILM

[76] Inventors: Michael Lehmacher; Hans Lehmacher, both of 5215 Mondorf Ub., Troisdorf, Germany

[22] Filed: July 18, 1973

[21] Appl. No.: 380,257

Related U.S. Application Data

[62] Division of Ser. No. 5,417, Jan. 5, 1970, abandoned.

[52] U.S. Cl. ............... 93/35 H, 93/8 WA, 93/33 H
[51] Int. Cl. .................................................. B31b 1/86
[58] Field of Search .... 93/35 H, 8 WA, 33 H, 35 R, 93/DIG. 1

[56] References Cited
UNITED STATES PATENTS

| | | | |
|---|---|---|---|
| 2,372,008 | 3/1945 | Krueger | 93/35 H |
| 2,971,874 | 2/1961 | Canno | 93/8 WA |
| 3,077,820 | 2/1963 | Been | 93/35 R |
| 3,451,316 | 6/1969 | Bagnall | 93/35 H |
| 3,548,723 | 12/1970 | Sengewald | 93/35 H |
| 3,640,187 | 2/1972 | Mundus | 93/35 H X |
| 3,698,289 | 10/1972 | Kamins | 93/35 H X |

Primary Examiner—Roy Lake
Assistant Examiner—James F. Coan
Attorney, Agent, or Firm—P. D. Golrick

[57] ABSTRACT

To make an expansible side-infolded carrying bag of thermoplastic synthetic plastic film, with opposed grip bars bonded across the mouth top by relatively simple apparatus, a flat tubular film web as starting material is continuously formed from single layer stock, the web is rectangularly oppositely edge-notched at locations corresponding to bag lengths, the edges are infolded to the notching depth and successive bag lengths severed at leading notch edges, defining on the web end a mouth readily opened for easy insertion, for each bag without infold interference, of paired superimposed grips bars thereafter welded to respective mouth margins; a transverse bottom seam for an open-mouthed bag or a mouth-closing seam below the grip bars for a bottom-filled packaging bag being welded before or simultaneously with the grip welds; with disclosure of method variations.

9 Claims, 14 Drawing Figures

FABRICATION OF A CARRYING BAG FROM THERMOPLASTIC SYNTHETIC FILM

The present application relates to a synthetic plastic thermoplastic film carrying bag having longitudinal side infolds i.e., so-called gussets and carrying-grip structure at the bag mouth comprised of molded or extruded plastic and is a division of copending application Ser. No. 5417, filed Jan. 5, 1970 and now abandoned.

Hitherto the manufacture of carrying bags having side folds i.e., so-called gussets and grip structures including stiff plastic elements extending across the bag width has been difficult, for, although the bag body could be machine-made, hand-application of grips is entailed, since these could be introduced into the mouth of the bag only with considerable difficulty. The hand assembly of the grips so increases the cost of the aforedescribed bags that only quite rarely are they to be found on the market.

It is an object of the present invention to provide a bag of the aforementioned type which can be completely machine-made as from a flattened tubular web and accordingly at an attractive price. For the attainment of this object, in a carrying bag of the type having side infolds as supplied flat and empty and, at the bag mouth, stiff carrying grip bars, the top edges of the infolds on both sides are simply cut away, so that the grips can be easily introduced by machine into the end of a flattened tubular web or bag body for welding thereto. With this bag construction, grip insertion can be easily made from the front or laterally of the mouth forming region, for the bag walls at the mouth region can be simply lifted away from one another, and further no means are required to spread the side folds from the associated tube walls.

Preferably the carrying grip structure is comprised of plastic slat-like bars of appropriate stiffness, obtainable by extrusion methods, and therebeneath grip hole openings punched out or incised in the two bag body walls. Also it is preferred that the grip bars have a tongue-and-groove engagement in one another, thereby not only to obtain a closure for the bag, but also to simplify the assembly in the bag, since with this separable connection the two grip straps are easily introduced together into the bag mouth and also welded simultaneously with the respective bag walls.

Further it is preferred to use a welded bottom seam beveled in the region of the infolds, i.e., at the bottom corners with the sides of each infold welded to respective adjacent bag walls, but not to each other. By this expedient, a carrying bag is obtained having a unique expanded bottom region when filled, and a hitherto unattainable carrying capacity. Welding of the opposed side folds to each other can be prevented through printing of color or weld inhibiting material on the outer surface of the side folds, but other expedients are available, for example, the interposition of a Teflon web, or a like material between the side folds.

For fabrication of the described carrying bag, a web of flattened tube of thermoplastic synthetic plastic film is used comprising either a flattened extruded tubular stock or a flat "tube" made by folding over along its center line a wide single layer stock and longitudinally seam welding the coincident edges. At successive longitudinal spacings corresponding to the desired bag length, preferably rectangular edge-notch punch outs are made through both layers in both web edges in paired opposition, to a notch depth corresponding to or nearly to the depth of the infolds of the desired bag product; and both edges of the advancing double-layered or tubular web are longitudinally tucked or symmetrically folded inward. Thereafter transverse bottom seam welding is performed with successive severance of bag sections from the web head end on the border of each notch pair; and after insertion of the grips into the bag mouth or web end, the welding of the walls to the grips at the mouth is carried out with respective welding devices. Further in the basic process of the invention, transverse weldings for the bottom seam and the hand grips can be carried out simultaneously.

The two grips to be assembled, in the novel bag construction, now can be brought into ready position lying upon one another in the plane of and aligned with the tube web; and during the motion of the web in the direction towards the readied grips, the two tube walls are separated from one another. This proposal offers the possibility of a high production rate.

Furthermore it is proposed that, after the separation from the web with the aforementioned simultaneous formation of the bottom welding seam, the bag body sections be carried off transversely to the web motion direction; and that along this transverse path, the bag mouths be opened, the grips be inserted therein from the front or the side, and finally that the mouth edges be welded to the grips. It is particularly advantageous that, along this transverse working path the named operations be carried out at respective work stations simultaneously on two bags lying next to each other enabling bag fabrication in pairs.

A particularly advantageous machine for manufacture of bags of the aforedescribed type comprises two synchronously driven web feed and advance means, such as roll pairs spaced from one another, between which means the bottom seaming and severing device is disposed; and, considered relative to the direction of web movement, behind the second roll pair there is disposed a device for separating the two walls or layers at the head of the web (i.e., at the mouth of a bag body section); thereafter welding apparatus on the upper and lower web sides for contacting and welding the bag section to the grips; and finally the grip feed and holding mechanism. In such case the means for spreading of the two layers or walls is comprised of two air suction pads disposed respectively above and below the web; and the grip elements are transferred in pairs from a supply magazine and brought upon a support table holding each pair in ready position for insertion; the table preferably being tiltably mounted in the machine.

Especially useful, as the second advance means for transport of bag sections severed from the web, are sets of endless tapes disposed on both the upper and lower sides of the bag or web path and adjustable in their effective length. The change in the effective tape length in each set is attained through vertical displacement of one tape guide roll serving as a take up with a simultaneous displacement horizontally of the one of the two guide rolls which establishes the bag-contacting tape reach; this second shiftable roll being disposed toward the welding bar device which carries a web severing knife to separate successive bag body sections.

To enable advance of the web by a predetermined amount with a simultaneous removal of the severed bag section, and aligned feeding of the latter into the following working device, subsequent to the device for transverse severing and perhaps welding, alternating sets of endless tapes and rolls are disposed transversely of the web path direction in respective pairs on opposite sides of the web path, the roll set preferably coupled with the main web feed roll pair. In this case with the tapes not in driving contact, the rolls transport the severed section in the direction of the original web motion; and thereafter with the rolls stationary and lifted away from driving contact with the severed bag section, the endless tapes are then brought into driving engagement with and move the section in the transverse direction.

The various aspects of the invention are further explained with respect to certain particular embodiments shown in the drawings, as examples, but not by way of limiting the invention to the specific arrangements there represented.

In addition to those above pointed out, other objects and advantages will appear from the following description and the drawings wherein.

Figures 1, 2:
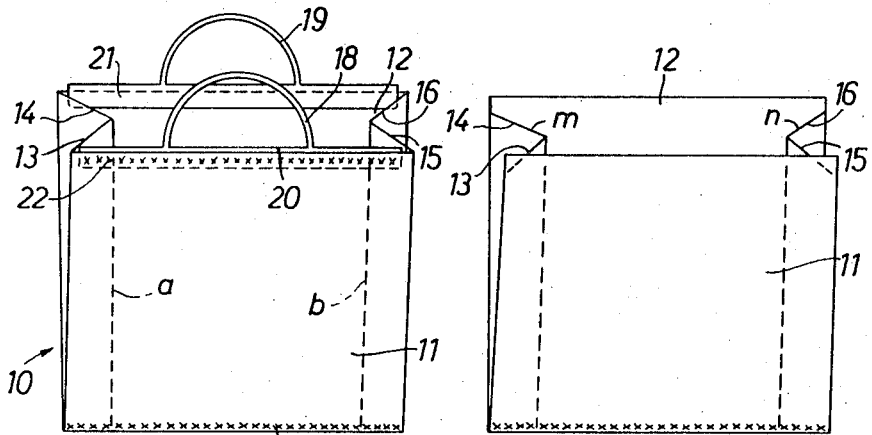
FIG. 1 is a perspective view of a known bag of the type with which the present invention is concerned.
FIG. 2 is a perspective view of one bag embodiment of the invention, wherein carrying grips are omitted for clarity and simplification of representation.

In the drawings, amongst which analogous parts or elements generally have like reference characters, FIG. 1 shows a known bag 10 of the type with which the present invention is concerned, having a body made of thermoplastic synthetic plastic film. The body is comprised of flat parallel generally rectangular front and back walls 11, 12 joined on both sides by like inward longitudinal tucks of side or (designated by a, b, applied to the respective center or innermost edges) resulting respectively in paired and opposed side fold panels or walls 13–14 and 15–16; the body being closed at the bottom by a weld seam 17 and at its top or mouth end provided with a carrying grip structure. The grip structure includes the two injection molded plastic carrying grip elements 18 and 19 having like stiff slat-like bar portions 20, 21 extending over almost the entire bag width and inserted into the mouth and bonded to the mouth margins or edges of the respective bag walls 11 and 12, by a welding seam 22.

Fabrication of a bag of the type represented in FIG. 1 hitherto involved hand insertion or assembly of the carrying grip elements 18 and 19, because of difficulty in introducing the respective bar portions 20 and 21 respectively between the bag wall 11 and the two side folds 13–15 and between wall 12 and side folds 14–16.

The present invention very much simplifies machine introduction of the carrying grips 18 and 19 into the bag body and thus also the overall fabrication of the bag, by the expedient of terminating the side folds 13–14, 15–16 in top edges m, n, at a non-interferring height appreciably below the wall mouth edges of the bag, that is, below the region of application of the securing bars 20 and 21 of the grips 18 and 19 as shown in FIG. 2, (where, however, for simplicity and clarity of representation the grips themselves are omitted). Thus with only a slight spreading of the mouth edges of the bag walls 11 and 12, it is simple to introduce paired superimposed grip elements either from the open end or from the sides into proper position for securement to and between the walls.

Figure 3:
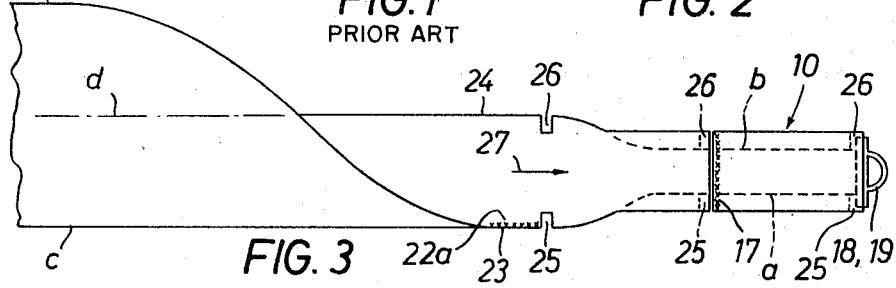
FIG. 3 is an essentially schematic representation of the fabrication of a carrying bag in accordance with the invention.

In FIG. 3, there is shown bag fabrication starting with flat single layer thermoplastic film web which as it advances in the direction of arrow 27 is folded about its middle longitudinal axis d over upon itself to bring the free edges c—c into superposition for continuous longitudinal joining by a welded seam S, which is no further represented or discussed in the drawings and the description thereof. In the edges 23, 24 of the resultant "flattened tubular" or edge-joined two-layer web (or alternatively of a flattened extruded tubular synthetic film web provided as the supply stock), at precisely transversely opposed positions, paired like rectangular cut outs or edge notches 25, 26 are made at successive longitudinal positions spaced corresponding to the length of the bags to be produced; these edge notches being made through both web layers to a depth corresponding to the depths of the side folds, that is, the like width of the side fold walls or panels 13–14, 15–16 to be produced.

Immediately thereafter, as the web is advanced in the direction 27, it is longitudinally infolded or tucked to invert the original web edges 23 and 24 respectively to the positions indicated by the dotted lines a and b, thus producing the basic structure from which is derived the body of a bag such as those shown in FIGS. 1 and 2. Precisely at the leading edges of the each notch pair 25–26 successively, there are made a transverse severing cut and on the leading side thereof a transverse welding seam to produce the bottom weld seam 17. The said severing made immediately behind this seam by a suitable knife, (for clarity of representation exaggerated as a wide split in FIG. 3), separates from the head or leading end of the web one bag body section 10 and simultaneously produces the mouth opening for the following bag section. In the opening or mouth of the bag body section 10 at the head end of the web (at the right in FIG. 3), the carrying grip elements 18 and 19 are introduced and welded as described in further detail with respect to FIGS. 4-6 inclusive.

Figure 4:
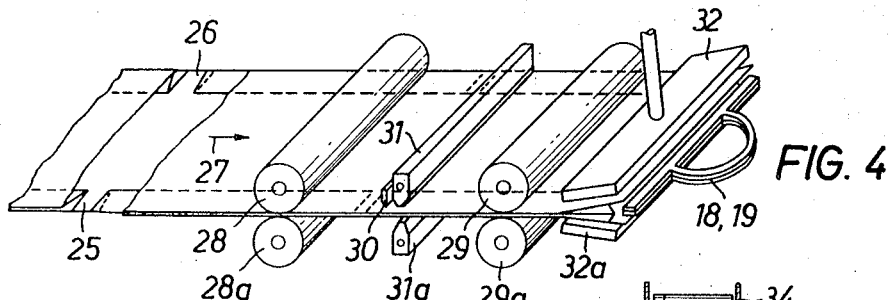
FIG. 4 is a perspective and somewhat generalized representation of one embodiment of apparatus aspects of the invention.
Figure 5:
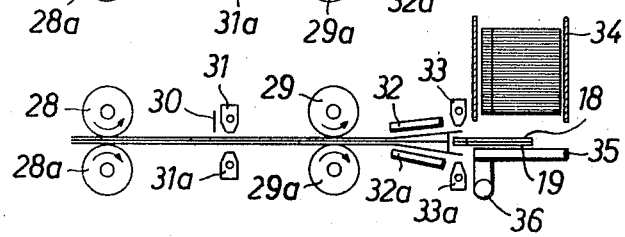
FIGS. 5 and 6 are side views of the apparatus of FIG. 4 at different operational working stages, with FIG. 5 showing further components.

In FIG. 4 the flattened "tubular" web, already notched at 25-26 and infolded, is advanced in the direction 27 into apparatus comprised of similiar first and second web feed or advance roll pairs 28—28a, 29—29a respectively; a severing and welding device mounted therebetween including the severing knife 30 and the upper and lower opposed welding bars 31—31a, which latter produce the bottom seam weld 17; and, as viewed in the direction of web motion, mounted behind the second advance roll pair 29—29a, the mouth-opening air suction boxes or vacuum pads 32—32a, respectively disposed on the upper and lower sides of the web. Further, as shown in FIG. 5, a second pair of opposed welding bars 33—33a is mounted beyond the suction boxes for welding the mouth marginal portions of walls 11-12 respectively to the bar portions of grip elements 18-19. The latter superimposed and aligned in pairs are supplied from the feed and dispensing magazine 34, onto the tiltable support or "ready" table 35, where they are held stationary overhanging the table edge at the plane of and centered transversely in the path of the web, and thus by such means the grip bars are presented ready for introduction into the mouth of the leading bag section advanced thereover. However, as later described, the grip element pair may be moved into a stationary bag section.

The roll pair 28—28a feeds the web just far enough to be engaged by the second pair 29—29a, while the welding bars 31—31a with associated knife 30, and also the welding bars 33—33a, are retracted from the web path. The suction boxes or pads 32—32a exert a suction upon the front ends of the respective web walls and thereby draw these apart; and accordingly the retracted forward mouth region of the web advances to a position where the margins of the walls 11 and 12 are respectively above and below the waiting pair of grip elements 18-19, as represented in FIGS. 4 and 5.

It is to be understood that the separation of the two web layers or bag section walls is preferably attained by retracting the top wall upwardly while actually maintaining the lower wall in position, where it generally may be securely held by the described suction device against upward lifting upon the retraction of the upper wall.

By virtue of the edge notches or cutouts 25-26, the side folds 13-14 and 15-16 have been cut away in the region of the bag mouth where the hand grip elements are to be applied, so that they cannot interfere with these insertion operations, nor with the above described retraction of the walls 11-12 by the simple operation and structure of suction boxes 32-32a.

Figure 6:
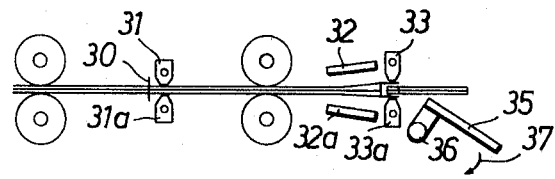

When the web is advanced so far that its forward end overlaps the grip element base strips or bars 20-21, the advance rolls stop; and the welding bar pairs 31—31a and 33—33a are synchronously moved, the severing knife 30 being also simultaneously brought into cutting position, whereby the bottom seam weld 17 is applied; the severing cut is made; and simultaneously the grip elements are welded to the respective bag walls through the welding bar pair 33—33a, as represented by FIG. 6.

When the welding is completed, table 35 is tilted about the axis 36 (see FIG. 6) in the direction indicated by the arrow 37, and the advance rolls 29—29a feed through the completed bag, which also may be guided along a gravity discharge path by the tilted table 35. The rolls advance the web for a further bag length to begin another cycle; and thus the above described manner of operation is constantly repeated. The tiltable table 35 moves synchronously between the working position and the discharge position; but it is also possible to have the table 35 remain stationary as long as its surface is so constructed that it does not impede the removal of the finished bags.

Figure 6A:
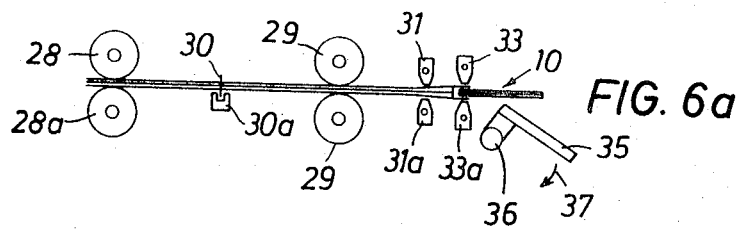
FIG. 6a is a generalized side view of a modification of the machine shown in FIG. 4–6.

FIG. 6A represents a modification of the machine of FIGS. 4-6 inclusive, wherein for the production of a carrying bag such as that represented in FIG. 13, the welding bars 31—31a are located quite closely adjacent to the welding bars 33—33a; the severing knife 30 here cooperating with an opposed reaction pad element 30a disposed below the web path.

Figure 13:
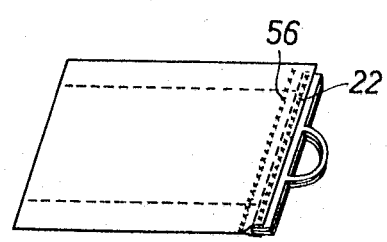
FIG. 13 is perspective view of a further bag modification.

The bag of FIG. 13, in addition to the welding seams 22 for the securement of the grips to the bag body, has a further welding seam 56 for sealing the two bag walls (including the side folds) to one another. Therefore as produced the bag is closed at the top, but is left open at the bottom for filling, as is desirable where the bag is to be used for packaging of goods to be offered for sale in the closed bag. After filling, a bag of this type is then closed at the bottom.

It is to be noted also that the second advance roll pair 29—29a of FIGS. 4-6 can be replaced by another form of conveying device; thus, for example, the known conveyor tape mechanism used for transport of bags in bag fabrication machines, as hereinafter described.

Figure 7:
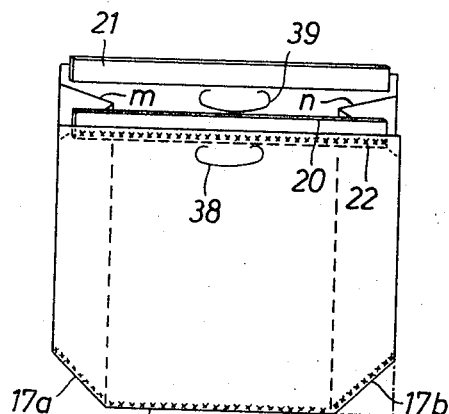
FIG. 7 is a perspective view of another bag constructed in accordance with the invention.

In the bag of FIG. 7, the grip bar elements 20-21 lack grip bails, which in the overall bag grip structure are replaced by the grip hole incisions or punch outs 38, 39 in the respective bag walls below the cooperating with the bars 20-21, which reinforce the grip region. Furthermore, at the corners, the bottom weld seam 17 in the region of the side folds is sloped or beveled at an angle of 45°, with the sloping seam weld portions 17a and 17b each actually representing two seams connecting each side fold panel with the respectively adjacent bag wall; but with no welding between the respective panels or walls of each side fold. This seaming can be achieved by imprinting a suitable weld preventing material on the outer surfaces of the side folds, at least in the region of the obliquely running welds 17a and 17b; or, for example, can be also obtained by interposing a Teflon strip or band between the side folds before welding, or through some other weld impeding expedient.

Figure 8:
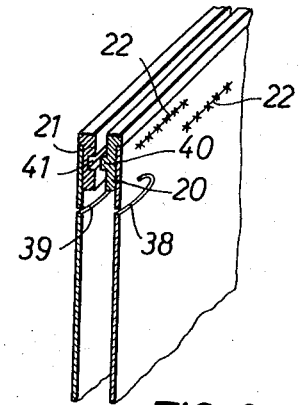
FIG. 8 is a fragmentary vertical section of a bag such as that of FIG. 7 represented, however, in closed condition and also showing a grip bar modification.

In FIG. 8 the grip bars 20-21a have a tongue-and-groove gripping engagement through the tongue 40 and groove 41 respectively provided over the entire lengths of the elements. By extrusion or rolling of plastic material, these cross sections or profiles are easily and simply obtained and then need only be cut off to the requisite lengths. It is preferable to extrude the two profiles 20 and 21 concurrently through two extrusion dies or nozzles lying closely adjacent to one another with the sections being brought into the tongue-and-groove connection with each other immediately after cooling and solidification; and then to cut off the required individual lengths. By the connected composite structure thus obtained, the simultaneous insertion of the two grip bars 20-21 into the bag body mouth is greatly simplified.

Figure 9:
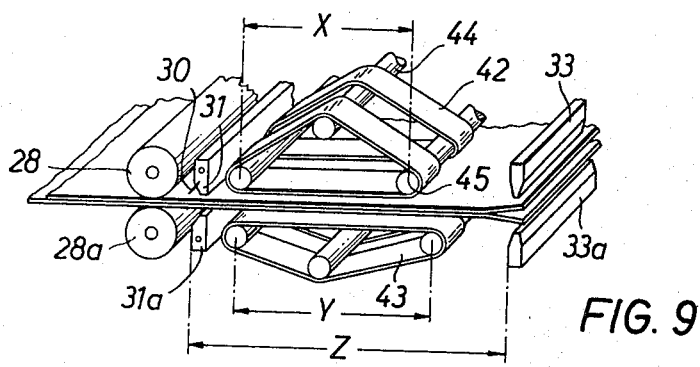
FIG. 9 is a perspective generalized view of a modification of mechanism for withdrawal of a bag section severed from the flattened tube web.

In FIG. 9 there appears a modification of the previously described apparatus by replacing the advance rolls 29—29a of FIG. 4 with endless conveyor bands or tapes 42-43. These transport tapes are intermittently operated in timed relation to the advance rolls 28—28a to convey the sections cut off from the web by the combined cutting knife and transverse seaming device 30-31-31a to the welding device 33—33a in a quite exact alignment.

To provide adjustability for the severed bag section advance, the effective lengths of the transport bands 42-43 are adjustable. This adjustability is obtained through a vertical or height adjustment of the vertically shiftably mounted upper tape guiding and tensioning roll 44 with simultaneously horizontal displacement of the horizontally adjustable mounted guide roll 45, which is that one of the rolls, establishing the effective tape reach adjacent the web, disposed remotely from the severing and welding apparatus 30-31-31a. A similar arrangement is used for the endless transport bands 43 cooperatively disposed below the web.

Although in actual machine operation the effective length is the same above and below, to exemplify length changes through the above described means, in the upper half of FIG. 9 the effective length is shown as having the extent "X," while the lower set 43 is represented with an effective length "Y." Also the horizontal spacing "Z" is adjustable between the two welding devices 31—31a and 33—33a by virtue of appropriate mountings of these devices in the frame (not shown) of the machine.

Though adjustment to the effective length of the transport tapes the position of the welding 22 of the bag wall to a grip can be changed and exactly positioned. FIG. 8 thus shows two weldings 22 in varying spacing relative to the bag upper edge.

Figure 10:
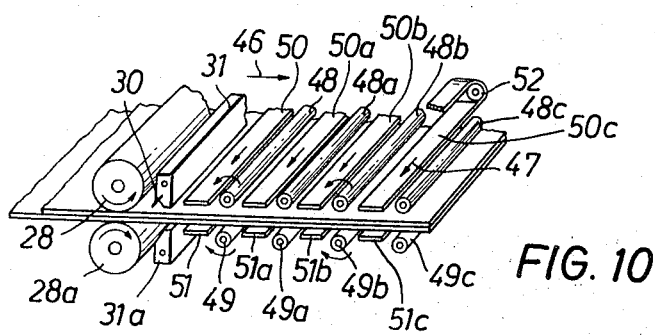
FIG. 10 is a mechanism for alternating advance and transverse shifting of a bag section relative to path of the web from which it has been severed.

FIG. 10 shows mechanism for changing the direction of the severed bag transport motion, comprised of a set of four spaced like paired roller sets 48-49, 48a-49a, 48b-49b, 48c-49c, wherein several upper rolls 48—48c, and lower rolls 49—49c are driven in like sense of rotation with and preferably simultaneously with the feed advance rolls 28—28a respectively. Both upper and lower rolls are vertically shiftably mounted for retraction from and advance into driving engagement with the web to transport the web or a severed bag section in the longitudinal direction 46 of the web path or motion.

Alternatingly positioned, as it were, interleaved with these rollers, where are respective pairs of simultaneously driven upper and lower endless bands or tapes 50-51, 50a-51a, 50b-51b, 50c-51c, extending and moving transversely of the web in the direction indicated by the arrows 47, likewise vertically shiftably mounted in the machine frame; the tape arrangements in general represented in fragmentary form by only a portion of their respective web-adjacent reaches, but each respectively supported, guided and driven in known manner by a plurality of guide drums or rolls such as 52, and therewith vertically shiftably supported to retract from and advance toward cooperating driving engagement with the top and bottom sides of a bag section or the web. Four or more roll pairs and four or more tape pairs may be used.

As soon as a sufficient web advance is obtained from the rollers, the upper and lower rollers of this mechanism are retracted from one another and thereby from driving engagement with the web or bag section, and after severance, the upper and lower tapes or bands approach each other, contacting the bag section to convey it in the direction indicated by the arrow 47.

In FIG. 10 the knife 30 is secured on the upper welding bar 31. It is, however, to be noted also with respect to FIG. 12 that merely a transverse cut of the tube web can be carried out at a severing station, (e.g. by a knife arrangement as at 30—30a in FIG. 6a) because in many cases it is particularly advantageous to make the welding seams 17 and 22 simultaneously.

Figure 11:
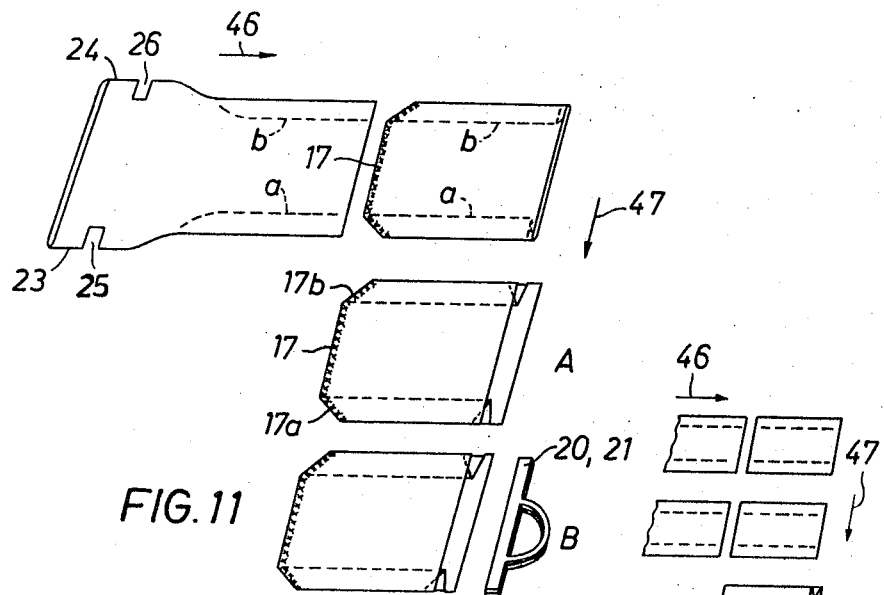
FIG. 11 is an essentially schematic representation of the bag fabrication method carried out, for example, by use of apparatus incorporating the mechanism of FIG. 10.

FIG. 11 shows schematically a particularly advantageous bag making method. After separation of a bag section from the web conveyed in the direction indicated by the arrow 46, with simultaneous application of the transverse bottom weld seams 17, 17a, 17b, the section is conveyed off in the direction 47, along a working path at right angles to the web direction 46. Thereafter at a work station "A," the bag body mouth is opened; at the next station "B," the grips 20-21 are simultaneously inserted, and finally at a work station "C," the welding seams 22 are made to bond the grips with the respective bag walls.

The mouth spreading can be effected by suction boxes 32—32a of the aforedescribed type with provision of means for keeping the bag open during its shift from station A to station B, for example, by means of spreading fingers engaging in the open bag mouth.

FIG. 11 further shows, also in essentially schematic manner, the bags discharged with their grip bails dropped onto a shiftable tiltable stacking bar or staff 55 about 1 meter long, having a cross sectional contour corresponding or fitted to the grip bails. Several such bag stacking staffs can be disposed on the outer circumference of a round plate as a table rotatably indexable, to present at all times a staff in proper position for stacked reception of finished bags. Then, after turning the table to bring an empty staff into bag reception position, bags are easily removed from a loaded staff, an operation facilitated by pivotally or tiltably supporting the staffs at their lower ends, so that each can be dropped even to a horizontal position from which stacked bags are easily slid off.

Figure 12:
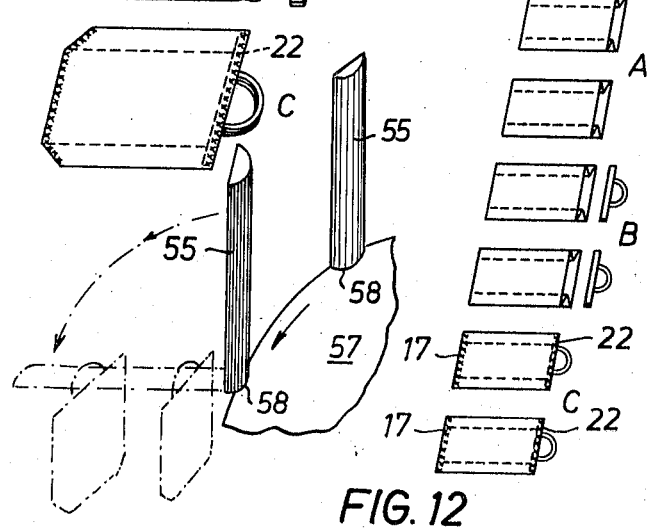
FIG. 12 is again a schematic representation showing modification of the method of FIG. 11 for the simultaneous fabrication of two bags.

FIG. 12 shows that two (or more) bags at a time can be made quite simply with the above described means, by feeding two "tubular" webs simultaneously in one machine in such fashion that two bag sections can be separated through a common severing knife; then transporting the sections away in a direction 47 at right angles to the web advance direction 46. Two or optionally even several adjacently lying bags then are simultaneously opened at the work station A; at station B the respective grip bar pairs are inserted; and in station C, there is carried out the welding of the grips and also (in this varying from the method in FIG. 11) of the bottom seam 17. However, in this case also, in order to obtain a spacious bag, the bottom seam can be beveled in the region of the side folds as in the bag of FIG. 7.

We claim:

1. A method for fabrication of carrying bags from thermoplastic synthetic plastic film, each bag with its longitudinal sides infolded throughout their lengths to form respective like infold panels joining respective edges of two opposed generally rectangular walls to constitute a bag body, and at the bag mouth having a carrying grip structure comprised of opposed parallel grip bars extending substantially across the bag body width and attached to a mouth inner margin of a respective wall; said method comprising the steps of;

providing a continuous web of flattened tubular thermoplastic synthetic plastic film comprised of two film layers continuously longitudinally connected at both edges, and advancing the web longitudinally;

at longitudinal spacing corresponding to desired product bag length, producing successively spaced pairs of edge notches through both web layers, the notches of each pair at opposite locations in the respective web edges, each notch having a depth corresponding substantially to the depth of the product side fold panel width; producing in the advancing web after said notches like longitudinal side infolds on both edges;

transversely severing the advancing web across the leading edges of the successive notch pairs, to separate successive bag sections from the leading end of the web, the severance of each bag section defining the mouth margins of a following bag section;

spreading the film layers at successively defined mouth margins and inserting the said grip bars between the spread layers at the mouth region;

and transversely welding the respective bag wall mouth margins to the inserted grip bars.

2. The method as described in claim 1, including the further step of transversely seam welding the web forwardly adjacent each severing cut for formation of a respective bag bottom seam; said seam welding and the welding of the bag wall mouth margins being carried out simultaneously.

3. The method as described in claim 2, wherein:
each two grip bars to be assembled are positioned in aligned superposed relation in the plane of the web path;
by advance of the web the spread layers of the mouth margins are brought about the positioned grip bars with the web advance then halted,
and thereafter carrying out the said welding of the layer margins to said respective layers.

4. A method for fabrication of carrying bags as described in claim 1, wherein
simultaneously with each said severing and forwardly adjacent the respective severing cut, a transverse seam welding of the web is carried out to form a bottom seam weld in the severed bag section;
after severing from the web each bag section is transported along a path extending in a direction transverse to the web path direction;
the steps comprising the said spreading, the said inserting and the said transversely welding are carried out on each bag section along the said transverse path.

5. A method for fabrication of carrying bags comprising the provision of two parallel advanced webs each operated upon as described in claim 4, and wherein
bag sections severed from respective webs are transported simultaneously along the said path transverse to the web advance direction in pairs comprising a bag section from each web, to first, second and third work stations, where there are carried out on both bags sections of a pair simultaneously, respectively the steps comprising the said spreading, the said inserting and the said transversely welding.

6. A method for fabrication of carrying bags as described in claim 1, wherein:
simultaneously with each said severing and forwardly adjacent the respective severing cut, a transverse seam welding of the web is carried out to form a bottom seam weld in the severed bag section;
after severing from the web each bag section is transported along a path extending in a direction transverse to the web path direction to first, second and third work stations, where respectively the steps comprising the said spreading, the said inserting and the said transversely welding are carried out on each bag section.

7. The method as described in claim 1, wherein:
each two grip bars to be assembled are positioned in aligned superposed relation in the plane of the web path;
by advance of the web the spread layers of the mouth margins are brought about the positioned grip bars with the web advance then halted,
and thereafter carrying out the said welding of the mouth margins to said respective grip bars.

8. The method as described in claim 1, including the further step of transversely seam welding the web rearwardly adjacent the location of each pair of grip bars welded to the respective bag wall mouth margins.

9. A method for fabrication of carrying bags as described in claim 2, including the further step of incising, through the web, grip hole cut-outs for each bag spaced rearwardly of, but adjacent, the locus for the respective grip bars.

* * * * *